Dec. 15, 1964   A. S. BROWN   3,161,252
EXHAUST SYSTEM HANGER FOR MOTOR VEHICLES
Filed Jan. 22, 1962
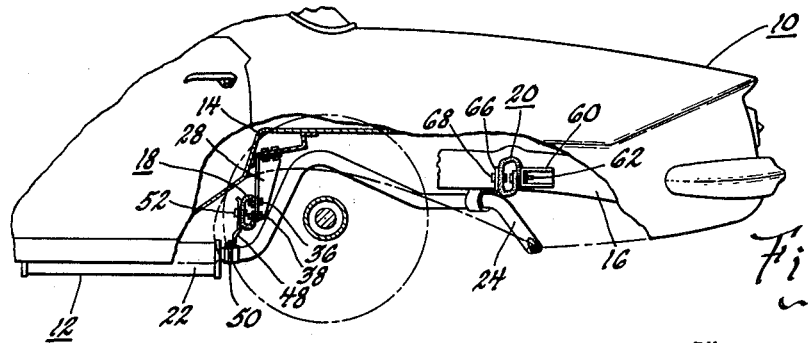
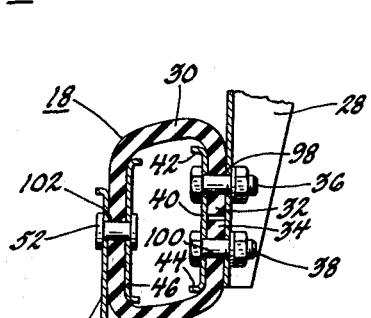
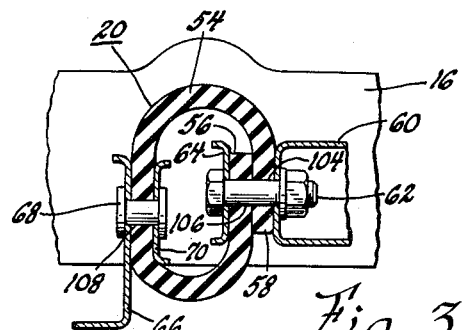
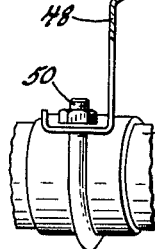
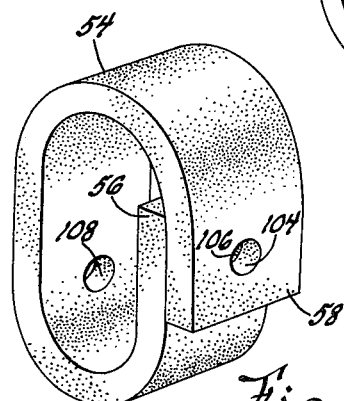
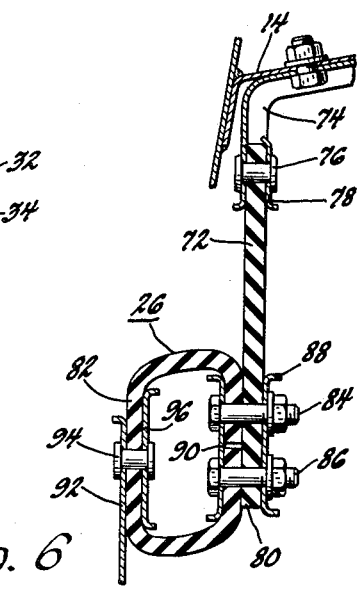
INVENTOR.
Arthur S. Brown
BY D. D. McGraw
HIS ATTORNEY United States Patent Office 3,161,252
Patented Dec. 15, 1964

3,161,252
EXHAUST SYSTEM HANGER FOR MOTOR VEHICLES
Arthur S. Brown, Detroit, Mich., assignor to General Motors Corporation, Detroit, Mich., a corporation of Delaware
Filed Jan. 22, 1962, Ser. No. 167,792
5 Claims. (Cl. 180—64)

The invention relates to exhaust system hangers for automobiles and more particularly to hangers which support portions of the engine exhaust system to provide a rolling action and permit the system to swing more vertically than forward or rearward while strongly resisting side swaying motions. The vertical deflection rate is softer than the fore and aft or side deflection rates.

It has been known in the past to utilize loops of suitable insulating material such as tire carcass material in the construction of exhaust system hangers. The attaching bolts utilized with such material have commonly been located at the upper and lower portions of the loop, thereby providing very little vertical rolling action and giving a structure much noiser than structures embodying the invention. It is now proposed to provide a looped tire carcass material positioned between the exhaust system bracket and the body bracket so that the axis of the loop is generally horizontal and extends transversely of the vehicle while the fastening means for fastening the loop to the brackets are located on horizontal axes extending longitudinally of the vehicle. The loops may be formed by overlapping the ends of tire carcass strip material, forming the material to provide continuous loops, or providing abutting or closely related ends of strips to form the loops. Additional vertical rolling action and forward and rearward movement of the exhaust system may be provided when necessary by attaching the looped material to a pendant strap of similar material. This softens the vertical deflection rate.

Further objects and advantages of the present invention will be apparent from the following description, reference being had to the accompanying drawings wherein a preferred embodiment of the present invention is clearly shown.

In the drawings:
FIGURE 1 illustrates a vehicle having exhaust system hangers embodying the invention installed thereon, with parts broken away and in section.
FIGURE 2 is an enlarged partial section view of one of the exhaust hangers of FIGURE 1.
FIGURE 3 is an enlarged partial section view of another of the hangers of FIGURE 1.
FIGURE 4 is a perspective view of the looped insulating material forming a part of the exhaust hangers illustrated in FIGURES 2 and 6.
FIGURE 5 is a perspective view of the looped insulating material forming a portion of the exhaust hanger of FIGURE 3.
FIGURE 6 is a partial section view illustrating a modification of the hanger of FIGURE 2.

The vehicle 10 is provided with an exhaust system 12 which is attached to the vehicle body 14 and frame 16 by means of the exhaust system hangers 18 and 20. The exhaust system 12 includes the muffler 22 and tail pipe 24 which conduct the exhaust gases from the vehicle engine to the atmosphere, discharging the gases at the rear end of the vehicle. Hangers 18 and 20 are illustrated as two modifications of the invention with hanger 18 being shown in greater detail in FIGURE 2 and hanger 20 being shown in greater detail in FIGURE 3. A modification of hanger 18 is illustrated by hanger 26 of FIGURE 6. The looped tire carcass material of hangers 18 and 26 is illustrated in FIGURE 4 and the looped tire carcass material of hanger 20 is illustrated in FIGURE 5.

Hanger 18 includes a bracket 28 which is attached to a suitable portion of body 14 and to the looped insulating material 30. This material may be tire carcass material or other suitable material. It is formed as a strap having ends 32 and 34 which either abut or are closely adjacent each other. End 32 is fastened to bracket 28 by bolt and nut assembly 36 and end 34 is fastened to bracket 28 by bolt and nut assembly 38. A plate 40 is provided on the inside of the looped material 30 so that it is parallel with the portion of bracket 28 to which the loop is attached. The looped ends 32 and 34 have their adjacent surfaces extending horizontally and transversely of the vehicle. This is accomplished by locating assemblies 36 and 38 so that they extend horizontally and longitudinally of the vehicle. The upper and lower ends 42 and 44 of plate 40 are curved so that the looped section 30 may roll around the ends without damage.

Opposite plate 40 and inside the looped section 30 is another plate 46 having similarly curved ends and cooperating with bracket 48 to secure that side of looped section 30 to the tail pipe clamp 50 by means of the rivet 52. The tail pipe 24 is tightly held by clamp 50. Rivet 52 extends horizontally and longitudinally of the vehicle, thereby further insuring the position of looped section 30 so that the loop axis extends horizontally and transversely of the vehicle.

FIGURE 3, illustrating the hanger 20, shows the looped insulating material 54 with its ends 56 and 58 overlapped and secured to the vehicle frame bracket 60 by the bolt and nut assembly 62 and plate 64. The looped section 54 is also secured to the bracket 66 by rivet 68 and plate 70. Plates 64 and 70 have curved ends. The assembly 62 and the rivet 68 extend horizontally and longitudinally of the vehicle and the axis of looped section 54 extends horizontally and transversely of the vehicle.

The modified hanger 26 of FIGURE 6 utilizes a pendant strap 72 of insulating material attached to the body bracket 74 by rivet 76 and plate 78. The lower end 80 of strap 72 is attached to the looped insulating material 82 in a manner similar to the attachment of the looped insulating material 30 of hanger 18 to its associated bracket 28. This includes bolt and nut assemblies 84 and 86 and plates 88 and 90. The looped material 82 is attached to the exhaust system support bracket 92 by rivet 94 and plate 96. The assemblies 84 and 86 and rivet 94 extend horizontally and longitudinally of the vehicle and the axis of looped material 82 extends horizontally and transversely of the vehicle. Strap 72 is of approximately the same width as looped section 82 and it extends in a vertical transverse plane relative to the vehicle.

The looped insulating material 30 is illustrated in perspective in FIGURE 4. This figure shows the relation of the ends 32 and 34 and also illustrates the bolt apertures 98 and 100 and the rivet aperture 102 through which the bolts of assemblies 36 and 38 and rivet 52 are respectively received. Looped insulating material 82 of the modification shown in FIGURE 6 is of similar construction.

The looped insulating material 54 of the construction illustrated in FIGURE 3 is shown in perspective in FIGURE 5. This figure particularly illustrates the relationship of the ends 56 and 58, the bolt apertures 104 and 106, which are aligned, and the rivet aperture 108.

The orientation of the rivets and bolt and nut assemblies and the looped insulating material allows the insulator to assume curved sections at the top and bottom which provide rolling action of the material. This in turn gives a sufficient exhaust system suspension. The exhaust system is also permitted to swing more vertically than forward or rearward by rolling the loop vertically but some forward and rearward movement is permitted by compressing or expanding the loop longitudinally of the vehicle. Side swaying motions are strongly resisted since they pass through the planes of the loop material. Exhaust hanger systems embodying the invention therefore provide improved vertical rolling action over previous loop type systems and thus result in the elimination of much of the exhaust system noise otherwise transferred to the vehicle interior. This is accomplished by utilizing the softer deflection rate of hanger systems having loops secured at the top and bottom portions where, in addition, compression of the loop as the exhaust system moves upwardly permits the plates or fastening means to engage and create bumping noises.

What is claimed is as follows:

1. A vehicle having a body and an engine exhaust member carried by said body and means resiliently supporting said exhaust member on said body, said resilient supporting means comprising a first bracket secured to the vehicle body, a second bracket secured to the exhaust member, and a flexible noise insulating loop secured to and between said brackets, said loop having free upper and lower portions and a center axis, said free upper and lower portions permitting a rolling of the loop in either direction from the center axis whereby a directionally controlled movement of the engine exhaust member with respect to said body results.

2. In combination, a support structure forming a portion of a vehicle normally subjected to vertical components of movement in operation, a vehicle engine exhaust system including an exhaust system member extending generally longitudinally of the vehicle, and means resiliently mounting said exhaust member of said support structure for relative damped movement therebetween, said mounting means comprising a first bracket secured to said support structure and a second bracket secured to said exhaust member, a flexible looped insulating material, and means respectively securing opposite sides of said looped material to said brackets and extending horizontally and longitudinally of said vehicle to permit a vertical rolling action of said insulating material and inhibit transverse movement of said exhaust member upon relative movement of said support structure and said exhaust member.

3. A vehicle having a body, an exhaust system, and an exhaust system support resiliently supporting said exhaust system under said body; said support comprising a first bracket and a looped flexible body formed from a strip of material and having the strip ends thereof terminating on one side of said looped flexible body and secured to said bracket, a second bracket, said looped flexible body having the side opposite said one side secured to said second bracket, said looped flexible body being mounted so that the center axis thereof extends in horizontal and transverse relation to the vehicle, said looped flexible body being adapted to roll back on itself on both sides of the first and second brackets to permit a vertical rolling action of said flexible material and inhibit transverse movement of the exhaust system support relative to the vehicle.

4. For use in a vehicle having an engine exhaust system, an exhaust system support structure for flexibly securing the exhaust system to the vehicle and comprising, a first bracket adapted to be secured to the vehicle, a second bracket adapted to be secured to the exhaust system, and a flexible noise insulating loop secured to and between said brackets, the center axis of said loop adapted to extend horizontally and transversely of said vehicle and having free upper and lower loop portions to permit a vehicle rolling action of said insulating material and inhibit transverse movement of said support structure upon relative movement of said support structure with respect to the vehicles.

5. A vehicle having a body and an engine exhaust member supported by said body, and means for resiliently supporting said engine exhaust member when normal oscillation occurs due to vehicle movement, said means comprising: a first bracket secured to said body in including curved ends; a second bracket secured to said exhaust member and including curved ends disposed in opposition to the curved ends of said first bracket; and a resilient looped member engaging said first and second brackets on opposite sides of the loop, said looped member being adapted to roll in either direction from the points at which it engages the first and second brackets thereby directionally controlling the oscillation of the engine exhaust member, the curved ends of the first and second brackets serving to control the rolling movement of the looped member and maintaining a spaced relationship between the opposite sides of the loop in any extreme of oscillation.

References Cited in the file of this patent
UNITED STATES PATENTS

| | | |
|---|---|---|
| 1,100,792 | Storer | June 23, 1914 |
| 2,902,102 | Gorman | Sept. 1, 1959 |
| 2,965,349 | Hutton | Dec. 20, 1960 |

FOREIGN PATENTS

| | | |
|---|---|---|
| 508,248 | Canada | Dec. 14, 1954 |